United States Patent [19]

DeVeau, Jr. et al.

[11] Patent Number: 4,544,234

[45] Date of Patent: Oct. 1, 1985

[54] LOW LOSS OPTICAL FIBER SPLICING

[75] Inventors: George F. DeVeau, Jr., Stone Mountain; Calvin M. Miller, Lilburn, both of Ga.

[73] Assignee: AT&T Bell Laboratories, Murray Hill, N.J.

[21] Appl. No.: 367,120

[22] Filed: Apr. 9, 1982

[51] Int. Cl.⁴ .............................................. G02B 5/14
[52] U.S. Cl. ................................................. 350/96.21
[58] Field of Search ..................................... 350/96.21

[56] References Cited

U.S. PATENT DOCUMENTS

| 4,077,702 | 3/1978 | Kunze et al. | 350/96.21 |
| 4,179,186 | 12/1979 | Tynes | 350/96.21 |
| 4,288,143 | 9/1981 | DiVita | 350/96.21 |

Primary Examiner—William L. Sikes
Assistant Examiner—Robert E. Wise
Attorney, Agent, or Firm—James H. Fox

[57] ABSTRACT

Optical fibers are spliced by a technique that yields very low loss and accommodates fibers having different outer diameters or having nonconcentric cores. The technique is especially useful for single mode optical fibers, and splice losses of less than 0.1 db in a wavelength range of about 1.3 to 1.55 micrometers is typically obtained. The splice comprises a slotted tube surrounding abutted fiber ends, with the tube being at least partially filled with cement. An outer cylindrical sleeve is optionally provided for increased strength. In splicing the fibers, the fibers are aligned by means of a scattered light detector comprising a slotted tube surrounding a portion of the fiber, and a detector at one end of the tube. A sensitive null indication is obtained which provides for precise alignment of the fiber cores.

9 Claims, 7 Drawing Figures

LOW LOSS OPTICAL FIBER SPLICING

BACKGROUND OF THE INVENTION

1. Technical Field

This invention relates to a method of splicing optical fibers, and optical fibers spliced thereby.

2. Description of the Prior Art

Various methods have been developed for connecting two optical fibers. Connectors and splices are two general categories of optical fiber joining techniques. While connectors typically have the ability to make multiple connects and disconnects, splices are usually used when lowest loss is desired in connecting two optical fibers. Currently, there are two general categories of optical fiber splices: fusion splices and cement splices. In fusion splices, the ends of two optical fibers are brought together, and the fiber is melted by a flame or electric arc, etc., in order to join the ends. In cement splices, the optical fiber ends are brought together and joined by means of a cement.

The low loss and wide bandwidth of single mode optical fibers promise excellent high capacity long distance communications. However, the small core diameter (typically less than 15 micrometers) of single mode fibers makes splicing more difficult than with multimode fibers, and the effects of end quality and transverse and angular misalignment are more critical. Reports of fiber losses as low as 0.35 db/km at 1.3 $\mu$m, and even less at 1.55 $\mu$m, make low loss splicing techniques important for maximum repeater spacing. For example, if a splice is placed, on average, every kilometer in a fiber that has an inherent loss of 0.4 db/km, and if the splice itself adds an additional 0.2 db loss, the average loss of the spliced fiber will be 0.6 db/km. However, if the splice loss is reduced to 0.1 db, the average loss of the spliced fiber would be 0.5 db/km. For a typical single mode optical fiber system, this reduction in loss is estimated to yield an increase in maximum repeater spacing of about 1 to 2 kilometers. Thus, a very significant economic benefit is realized by reducing the splice loss between low loss fibers.

Conventional splicing techniques that rely on the alignment of the outer diameter of the fiber, such as "V" grooves, rods, tubes, and to some extent arc and flame fusion, achieve lowest splice losses only for fibers with well-centered (<0.2 $\mu$m eccentricity) cores. Submicron core centering tolerances probably cannot be maintained in large-scale manufacturing; therefore, splicing of nonidentical fibers relying on cladding alignment methods can expect higher losses. This includes arc and flame fusion which have outside diameter or cladding self-aligning effects due to surface tension.

SUMMARY OF THE INVENTION

In this technique, two optical fibers having endfaces that are substantially flat and substantially perpendicular to the axes of the fibers are placed end-to-end. Next, a slotted tube is placed to surround the ends, and then at least partially filled with cement, typically ultraviolet curable cement. The fibers are aligned to produce minimum scattering of radiation directed through the fibers, as measured by a scattering detector, and the cement is cured. Optionally, a sleeve, typically in the form of quartz tubing, is then slid over the splice, sealed with cement, and cured. Splices of single mode optical fibers by this technique have yielded splice losses of typically less than 0.1 db, and averaging about 0.05 db.

DETAILED DESCRIPTION

The following detailed description relates to a method of splicing optical fibers, and fibers spliced thereby. The technique can be used with both single mode and multimode optical fibers. However, maximum benefit is achieved with single mode fibers, since they have small core diameters, typically less than 15 micrometers, and usually in the range of 5 to 12 micrometers, which require precise alignment for low loss splices. The present technique does not rely on the use of fibers with well-centered cores. The alignment is performed while monitoring light scattered from the splice to obtain best alignment of the cores themselves. This is complemented by the use of a slotted tube to hold cement around the fiber ends. This allows a relatively small amount of cement to be used, improves thermal properties of the splice, and allows precise alignment before and during curing of the cement.

In the present technique, the fibers to be spliced should have substantially flat endfaces that are substantially perpendicular to the axis of the fiber. A number of techniques for preparing fibers to have high endface quality have been proposed; see, for example, U.S. Pat. No. 3,934,773, coassigned with the present invention. A method that has been found to yield flat endfaces that are substantially perpendicular to the axis of the fiber in a high percentage of broken fibers is shown in U.S. patent application Ser. No. 370,369, filing date Apr. 21, 1982, allowed Apr. 27, 1984, now U.S. Pat. No. 4,473,942, by D. N. Ridgway, coassigned with the present invention. One method for determining the flatness and perpendicularity of optical fiber ends is shown in "Fiber Break Testing by Interferrometry: A Comparison of Two Breaking Methods," by A. S. Gordon et al, *Applied Optics*, Vol. 16, pages 818–819 (1977). By "substantially perpendicular" is meant that the fracture angle of the fiber, defined as the angle between the axis of the fiber and the normal to the plane of the endface, is less than 1 degree.

Figure 1:
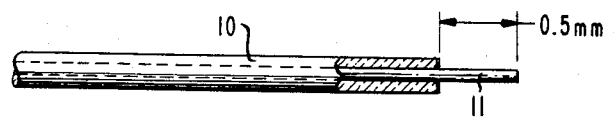
FIG. 1 shows an optical fiber prepared for splicing.
Figure 2:
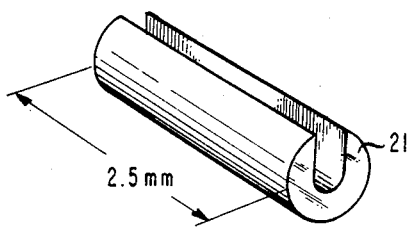
FIG. 2 shows a slotted U-shaped tube for surrounding a splice.
Figure 3:
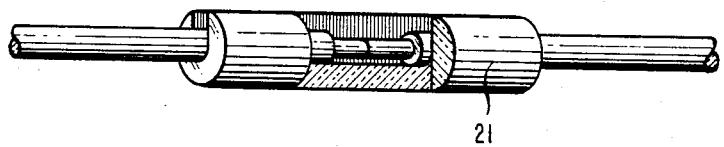
FIG. 3 shows an optical fiber splice within the slotted tube.
Figure 6:
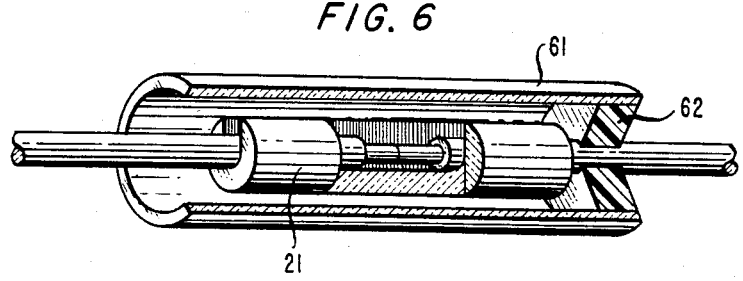
FIG. 6 shows an optical fiber splice strengthened with a glass outer cylinder.

The prepared fiber has approximately 0.5 millimeters of the coating removed; see FIG. 1, wherein bare fiber 11 extends from the coating 10. Two similarly prepared fibers will be placed in splice tube (21), shown in FIG. 2. For a fiber having an outer cladding diameter of about 125 micrometers, a typical splice tube is about 2.5 millimeters long, has an outer diameter of 0.9 millimeters, and a slot in the tube having a width of about 0.3 millimeters. The tube (21) is placed to surround the fiber ends, as shown in FIG. 3. The use of a slotted glass tube has been found very advantageous for the splicing of an optical fiber. This is due in part because the tube confines the cement to be used for splicing, allowing less cement to be used than in typical prior art techniques. This means that a high proportion of the material surrounding the fiber is glass, and a relatively low amount is cement. This provides for better thermal characteristics than a splice comprising mostly cement, due to the difference in thermal coefficients of expansion of glass and typical types of cement. In addition, the fibers can be moved within the tube before the cement is cured, allowing for precise core-to-core alignment of the fibers.

While the cement can be of many types, one type that has been found to work well is an ultraviolet curable cement made by Norland Products, Inc., Type NOA 61. The properties of this cement include a viscosity of 350 cps, a modulus of 150,000 psi, a tensile strength of 3,000 psi, an elongation of failure of 38 percent, a Shore D hardness of 85, and a refractive index of 1.56. An improvement in the refractive index match between the fiber cores due to the cement, as compared to an air gap, allows more precise alignment of the fiber cores. In the splice tube shown above, the curing of this cement can be accomplished with a 366 nanometer wavelength radiation from a lamp supplying 7,000 microwatts per square centimeter at a distance of 38 centimeters from the splice tube. The use of a glass splice tube facilitates the passage of the ultraviolet radiation into cement. However, if the type of cement used does not require radiation for curing, other types of splice tubes can be used.

Figure 4:
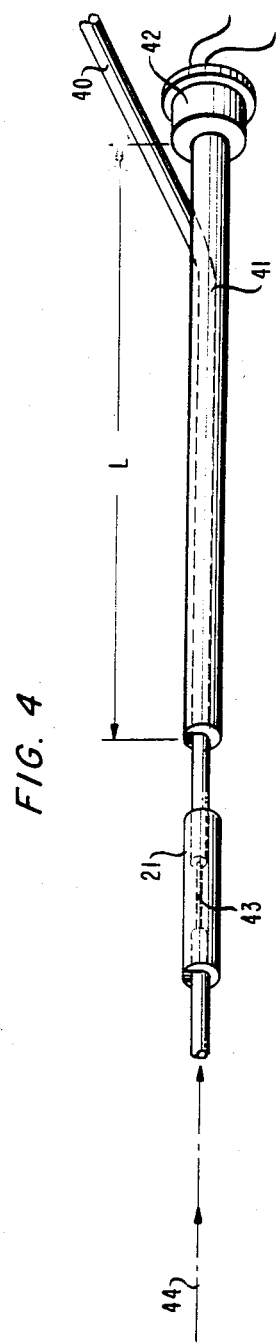
FIG. 4 shows a scattering detector for determining alignment of the fibers.

In order to accurately measure the proper alignment of the fibers, a scattered radiation detector is used, as shown in FIG. 4. In the alignment operation, optical radiation (44) is directed through one of the fibers toward the splice. The optical radiation is usually, but not necessarily, at the operation wavelength of the fiber. It is conveniently applied at an accessible endpoint of the fiber. It may alternately be inserted into the fiber by a coupler at a point relatively nearer to the splice. If the cores of the two fibers are not aligned, a portion of the radiation is scattered into the cladding of the fiber, and from the cladding into the coating. If the coating is not opaque, we have found that a sufficiently sensitive detector can be used to monitor the scattered radiation. A suitable detector comprises a slotted tube of the type shown in FIG. 2, but typically having a length of about 10 centimeters. The tube (41) is placed around the fiber (40). For maximum sensitivity, the tube is filled with an index-matching fluid; Cargille index oil having a refractive index of 1.47 is satisfactory. The use of the matching fluid is not necessary in all cases, depending on the strength of the radiation in the fiber. A detector (42), for example an indium gallium arsenide detector for optical radiation having a wavelength of about 1.3 micrometers, is positioned at the end of this tube, as shown in FIG. 4. It has been found that when the end of the slotted tube is perpendicular to the axis of the tube as shown, maximum scattered radiation pickup occurs. This is important in single mode optical fibers of long lengths, as the source of radiation may be at a considerable distance from the splice itself.

Figure 5:
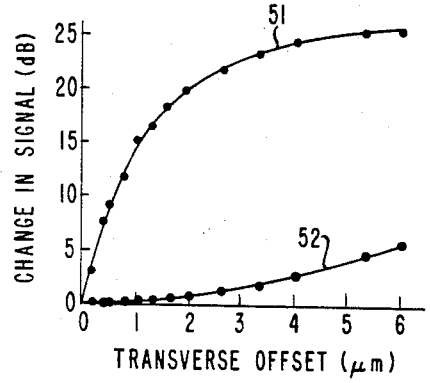
FIG. 5 shows the change in signal out of the scattering detector as a function of transverse offset of the fiber cores.

The scattered radiation detector is used for the alignment of the fibers, as further discussed in the procedures below. The high sensitivity of this detector is indicated in FIG. 5, which shows the change in signal from the detector as a function of offset of the two fibers; see curve 51. For comparison, a curve showing the amount of light transmitted through the fiber itself is shown in curve 52 as a function of offset. It can be seen that by monitoring local scattering near the splice, a much larger change in signal occurs for a given amount of offset. Therefore, a much more sensitive null point indication can be obtained using the scattered light technique than by merely monitoring the amount of transmitted light through the fiber.

The splice as described thus far has been found to have very low splice loss. However, it is desirable in many cases to provide for additional mechanical protection of the splice. For this purpose, a quartz sleeve (61) having an inside diameter of about 1 millimeter and an outside diameter of about 2 millimeters and a length of typically about 14 millimeters is slid over the splice. The ends of the quartz tube are sealed with cement (62), with the above-noted NOA 61 cement being satisfactory, and cured for about 4 seconds. The splice as prepared above then has suitable mechanical strength for placement of the splice in a typical splice case or other enclosure. The splicing technique will be more fully illustrated by means of the following Example:

EXAMPLE

Figure 7:
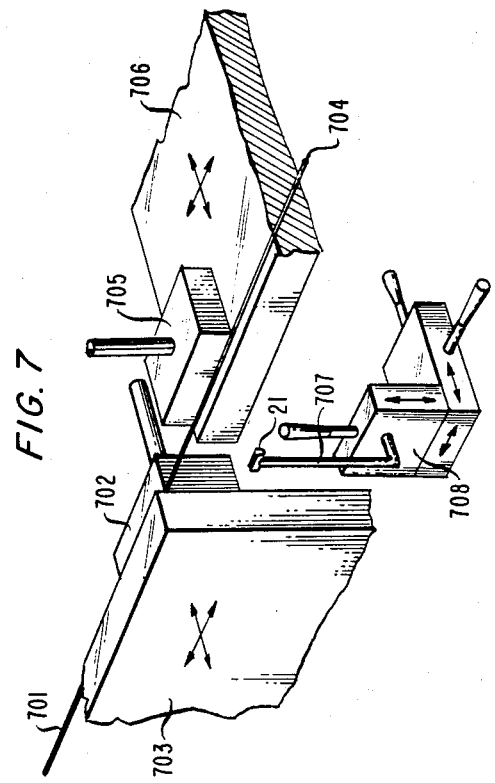
FIG. 7 shows an apparatus suitable for aligning the fibers during splicing.

Two optical fibers were cleaved so as to produce substantially flat endfaces that were perpendicular to the respective axes of the fibers to within 1 degree. The fiber ends were cleaned in ethanol using an ultrasonic cleaner. Referring to FIG. 7, one fiber (701) was placed in a vacuum chuck (702) on a movable stage (703). A second fiber (704) was similarly placed in a vacuum chuck (705) on a movable stage (706). Radiation at 1.3 micrometers was axially directed into the core of fiber (701); the scattering detector (41-42) (not shown) was placed around the other fiber (704). The fibers were initially aligned with a microscope at about 35 power, which allows the claddings of the fibers to be aligned. The ends of the fibers were slightly separated (about 10-15 micrometer gap) at this point to allow for alignment. The scattering detector was next monitored to provide an initial alignment of the cores. The slotted splice tube (31) was placed on a grooved support (707) and raised by a movable stage (708) so as to surround but not touch the splice. The splice tube was filled with Norland NOA 61 cement. The fibers were moved closer a few micrometers, and again aligned using the scattered radiation detector to observe the null point. The fibers were alternately moved closer and aligned until the ends touch. This was observed by noting that no change in detector output occurs as the alignment stages (703) and (704) were slightly moved. Then, the cement was cured by a 4 second exposure to ultraviolet radiation. A silica glass (quartz) cylindrical sleeve previously placed on one of the fibers was next slid over the splice. The ends of the tube were filled with the cement, without filling the central portion surrounding the slotted splice tube. The cement was cured as before.

What is claimed is:

1. A method of splicing optical fibers characterized by steps comprising obtaining two optical fibers having substantially flat endfaces which are substantially perpendicular to the axis of the fiber, placing the fiber ends in proximity, surrounding said ends with a first slotted glass tube that does not touch said fiber ends, with said slotted tube being at least partially filled with cement, directing radiation through at least one of said fibers, aligning the cores of said fibers by minimizing the amount of radiation scattered from said ends, and curing said cement by directing ultraviolet radiation through said tube, whereby a splice with improved thermal stability results.

2. The method of claim 1 wherein a cylinder is placed over said first slotted tube and cemented into place.

3. The method of claim 1 or 2 wherein the radiation scattered from said ends is detected by means of a second slotted tube at least partially surrounding a portion of one of said two fibers in the vicinity of said ends, whereby light scattered from said ends is coupled into said tube and thereby directed to a detector.

4. The method of claim 1 or 2 whereby the optical loss for radiation propagating axially through said spliced fiber at the operating wavelength due to said splice is less than 0.1 db.

5. An optical fiber spliced according to the method of claim 1.

6. An optical fiber comprising a splice between two optical fiber segments,
characterized in that
said splice comprises the ends of said optical fibers in at least approximate contact and surrounded by a slotted glass tube that does not touch the ends of said optical fibers, with said slotted tube being at least partially filled with an ultraviolet cured cement, whereby a splice with improved thermal stability results.

7. The optical fiber of claim 6 wherein said splice further comprises a cylinder surrounding said slotted tube, with the end portions of said cylinder being at least partially filled with cement.

8. The optical fiber of claim 6 wherein the optical loss due to said splice is less than 0.1 db at the operating wavelength of said fiber.

9. The optical fiber of claim 6 wherein said fiber is a single mode fiber.

* * * * *